United States Patent [19]
Watabe

[11] Patent Number: 4,773,125
[45] Date of Patent: Sep. 27, 1988

[54] DOOR CLOSER

[76] Inventor: Takaharu Watabe, 41-9, Hoshigaoka 2-chome, Hirakata-shi, Osaka-fu, Japan

[21] Appl. No.: 105,664

[22] Filed: Oct. 7, 1987

[30] Foreign Application Priority Data

May 28, 1987 [JP] Japan .................. 62-134458

[51] Int. Cl.⁴ ................................ E05F 3/22
[52] U.S. Cl. .......................... 16/53; 16/49; 16/58; 16/72; 16/DIG. 9; 16/DIG. 17
[58] Field of Search ............. 16/49, 53, 58, 66, 72, 16/85, DIG. 9, DIG. 10, DIG. 17

[56] References Cited
U.S. PATENT DOCUMENTS 3,763,519 10/1973 Favre .............................. 16/72
3,947,918 4/1976 Favre .............................. 16/72

FOREIGN PATENT DOCUMENTS 1816417 1/1971 Fed. Rep. of Germany ........ 16/72

Primary Examiner—Nicholas P. Godici
Assistant Examiner—Richard K. Seidel
Attorney, Agent, or Firm—Joseph W. Farley

[57] ABSTRACT

A link is pivotally connected at one end thereof to one end of a case or main body of a door closer so that the link is turnable between a first position where it is received in the case and a second position where it is put outside the case. A roller is attached to the link, and a cam member is installed within the case. Also installed within the case is an urging spring which causes the cam surface of the cam member to abut against the roller, whereby the link is urged in the direction to be received in the case. The case has no oil enclosed therein. Thus, the construction of the case is simple and inexpensive. When the door is closed, the link is received within the case to improve the external appearance.

5 Claims, 10 Drawing Sheets

DOOR CLOSER

FIELD OF THE INVENTION

The present invention relates to a door closer.

BACKGROUND OF THE INVENTION

Most of the known door closers are of the type which uses a spring housed in a casing having oil enclosed therein, the force of said spring urging the door in the closing direction.

In such conventional door closers, generally the casing or main body and the door are connected together by a double link and the force of the spring is transmitted to the door.

In the door closer of the aforesaid construction, since the casing or main body is required to be of sealed construction, it must be constructed to prevent oil leakage. Another problem is that the assembly operation of the door closer takes time and is expensive. For the sake of convenience of construction of the main body of the door closer, the double link is invariably positioned outside the main body, offering a problem that it detracts from the external appearance.

DISCLOSURE OF THE INVENTION

The present invention, which solves such problems, has for its object the provision of a door closer less expensive than conventional door closers, wherein in the closed state of the door, a link which connects the main body of the door closer to the door is received in the main body to improve the external appearance.

To solve said problems, the door closer of the invention comprises:

a case having a first end which is connected to either a door or an attachment frame for the door when the main body of the door closer is constructed, and a second end positioned opposite said first end, a link having one end pivotally connected to the second end of said case and a second end connected to the other element, i.e. said door or said door attachment frame, said link being revolvable between a first position where it is received in the case and a second position where it is put outside the case, depending on the opening and closing of said door, a roller disposed in the vicinity of the pivot portion at which said link is pivotally connected to the case, a cam member installed in said case, and means installed in said case for abutting the cam surface of said cam member against said roller and urging said link in the direction to receive it in the case. This arrangement provides a door closer less expensive than a conventional door closer of oil-enclosed sealed construction. In the closed state of the door, the link can be received in the case or main body of the door closer so that the external appearance is improved.

DESCRIPTION OF THE EMBODIMENTS

Figure 1:
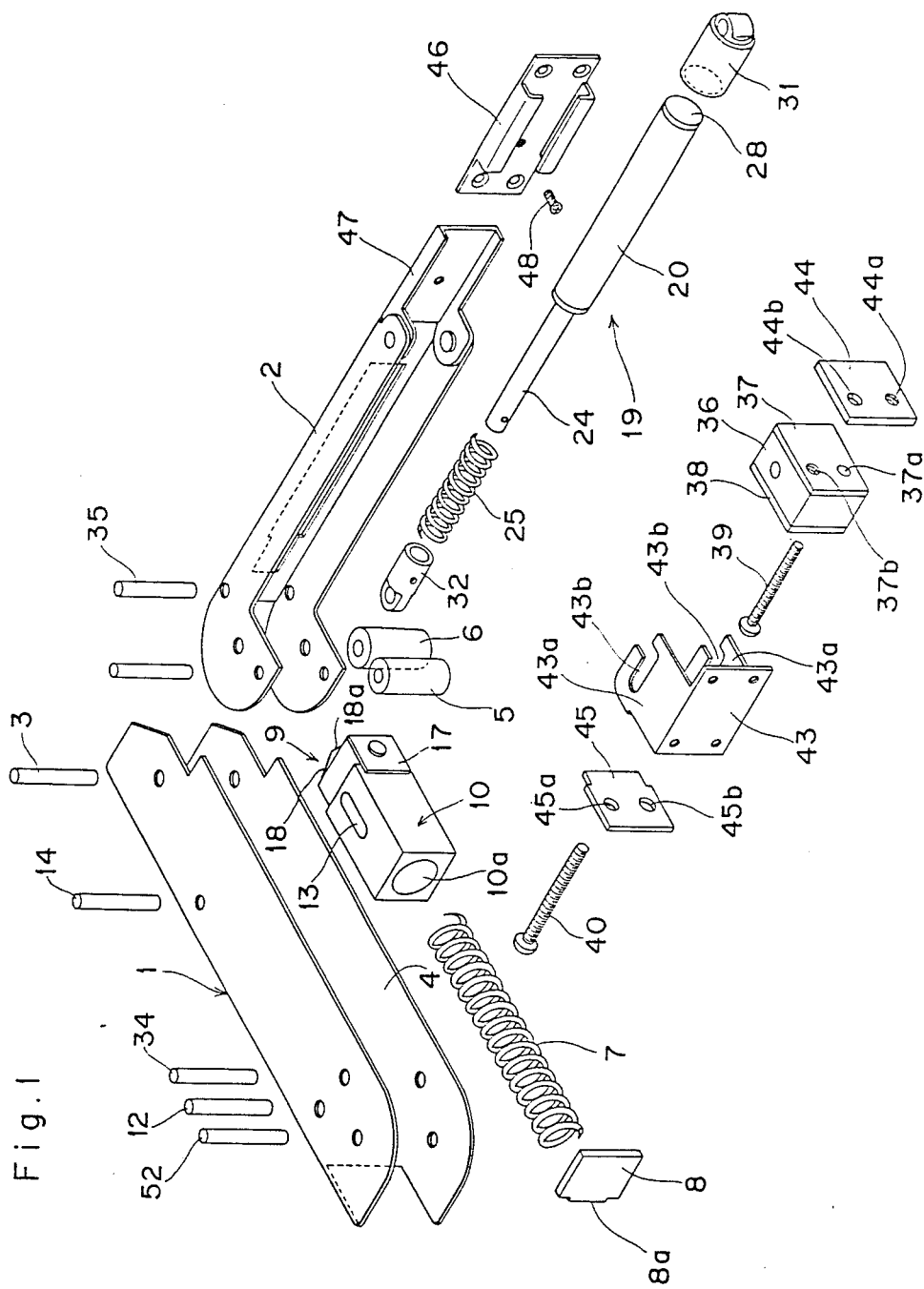
FIG. 1 is an exploded perspective view of an embodiment of a door closer according to the invention.
Figure 2:
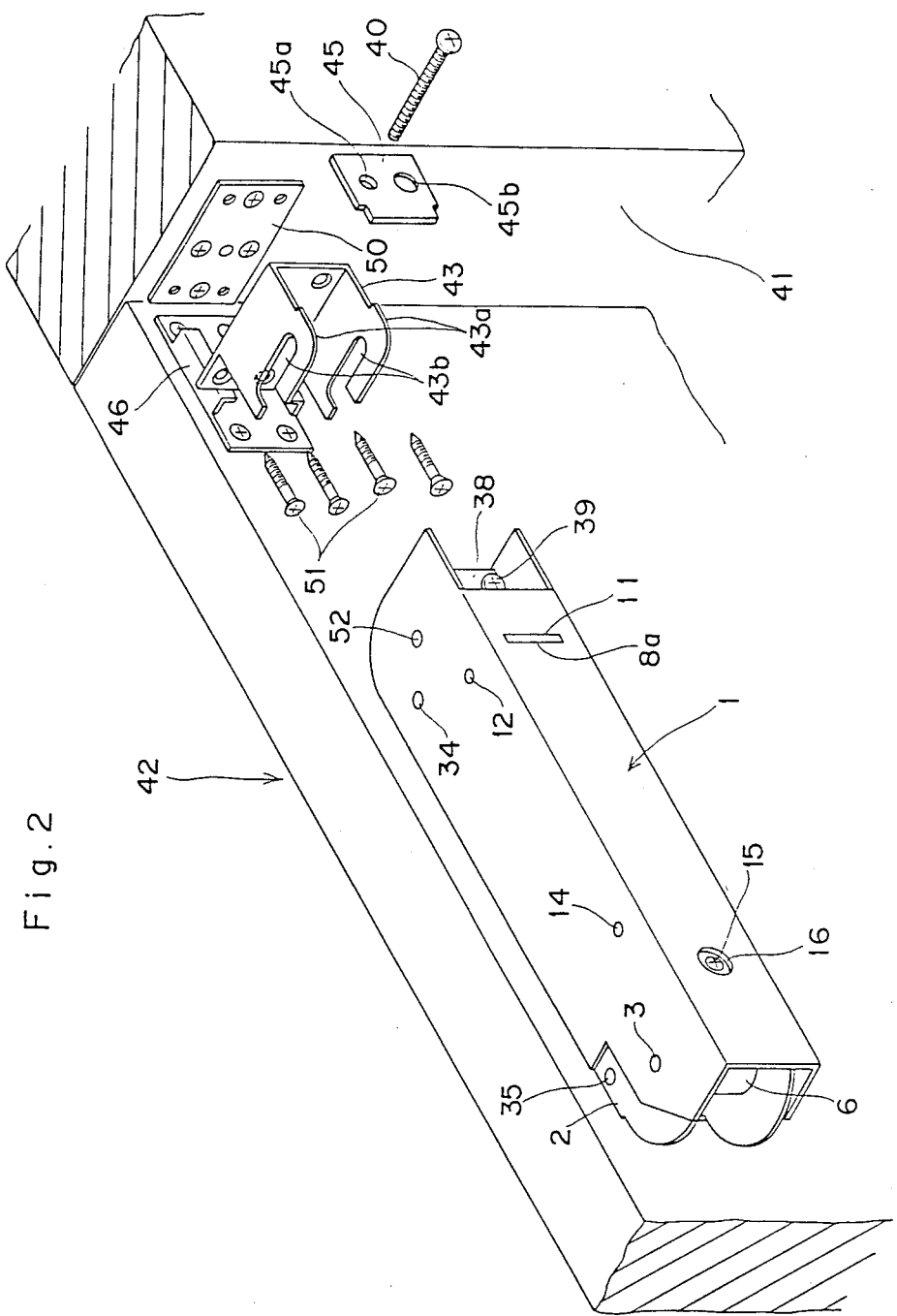
FIG. 2 is a perspective view showing the construction for attaching the door closer to the door attachment frame of a building.
Figure 3:
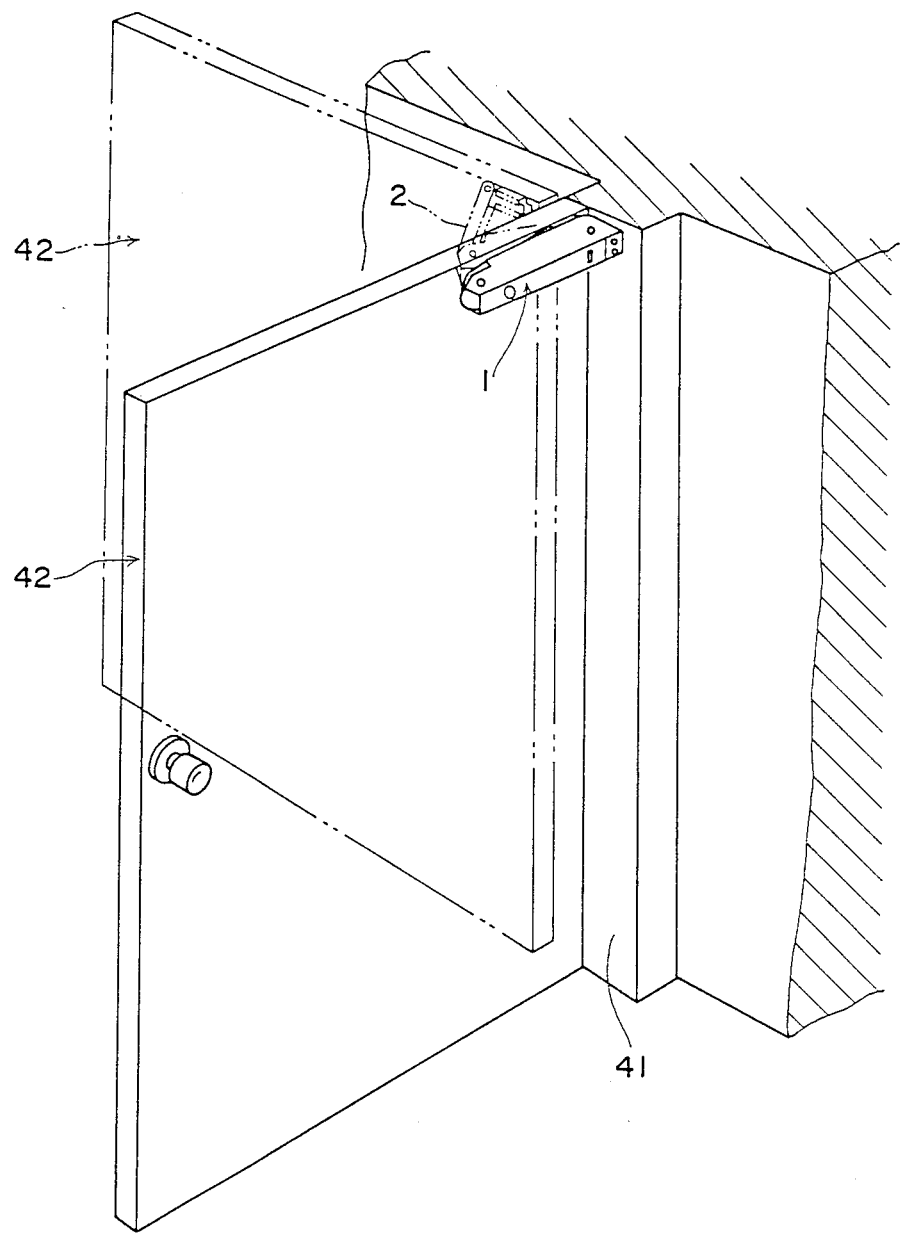
FIG. 3 is a schematic perspective view showing the door closer attached to the door of the building and to the door attachment frame.
Figure 4:
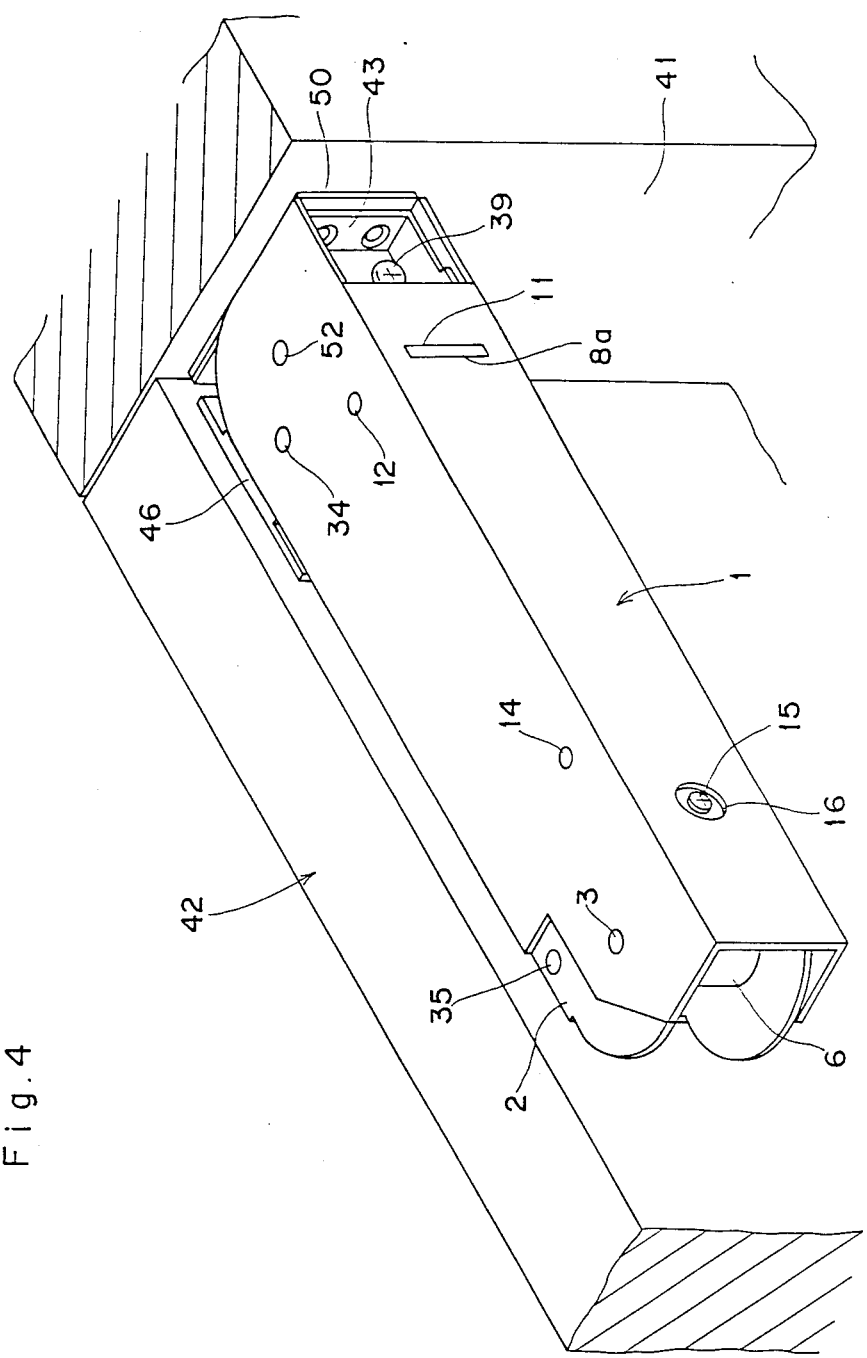
FIG. 4 is an enlarged view of the principal portion of FIG. 3.

In FIGS. 1 through 10, the numeral 1 denotes a metal case in the form of a channel which forms the main body of a door closer, one longitudinal end of said case 1 pivotally supporting one end of a link 2 by means of a shaft 3. The link 2 is adapted to fit in an opening 4 in the channel-shaped case 1 and is formed into a channel bent toward the interior of the case 1. At said one end of the link 2 and in the vicinity of the shaft 3, a synthetic resin roller 5 for spring pressure transmission is installed parallel to the shaft 3. Inside the link 2, a synthetic resin roller 6 is fitted on the shaft 3. The roller 6 serves to reinforce one end of the link 2.

The numeral 7 denotes a coil spring installed inside the casing 1 to extend lengthwise of the casing 1. One end of the coil spring 7 abuts against and is received by a support plate 8 installed in the vicinity of the other longitudinal end of the case 1, and the other end of the coil spring 7 is fitted in and received by a recess 10a formed in a spring seat member 10. The spring seat member 10 is made from synthetic resin and provided at one end thereof with a synthetic resin cam member 9 adapted to abut against the roller 5, said recess 10a being formed in the other end thereof. The support plate 8 has a projection 8a fitted in a notch 11 formed in the web portion of the casing 1 and is supported at its back by a shaft 12 attached to the case 1.

The spring seat member 10 is square and its outer surface abuts against the three inner surfaces of the case 1 so that it can be slid lengthwise of the case 1. More particularly, the spring seat member 10 has a long through-hole 13 extending lengthwise of the case 1, said hole 13 having inserted therein a shaft 14 attached to the case 1. The spring seat member 10 is slidable with said shaft 14 serving as a guide.

Figure 5:
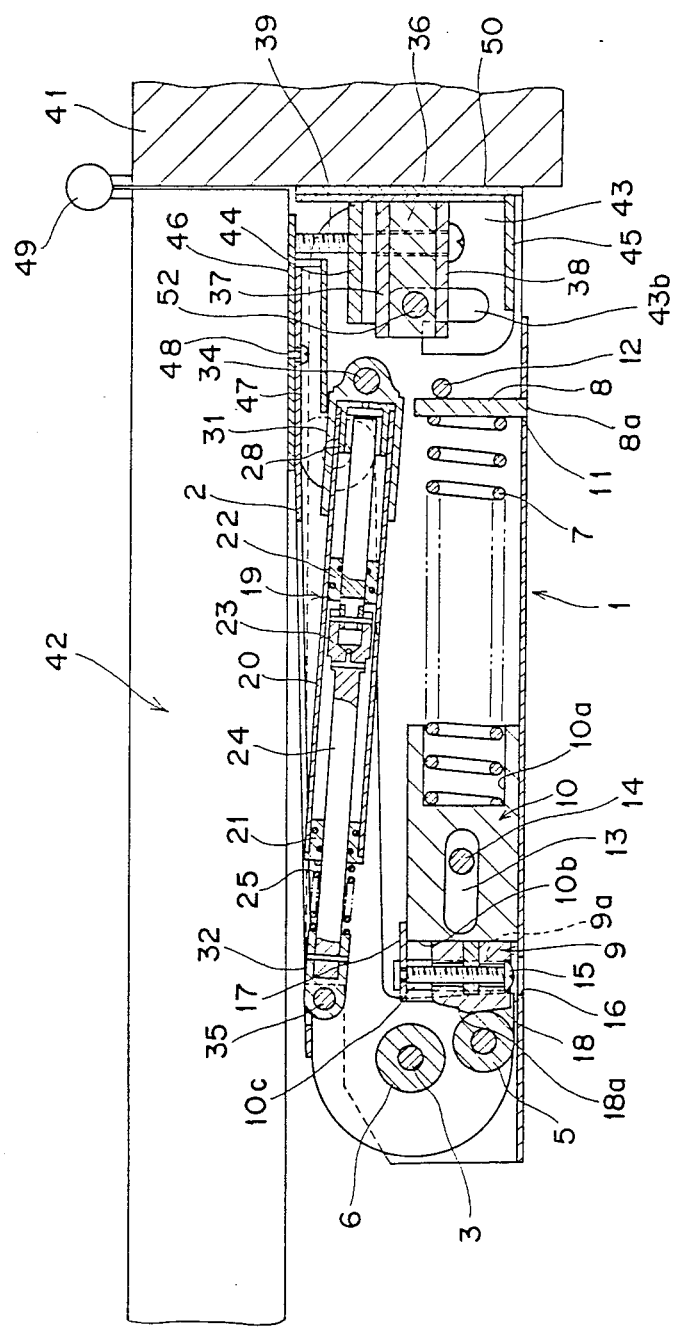
FIG. 5 is a plan view, in longitudinal section, of the door closer, with the door closed.
Figure 6:
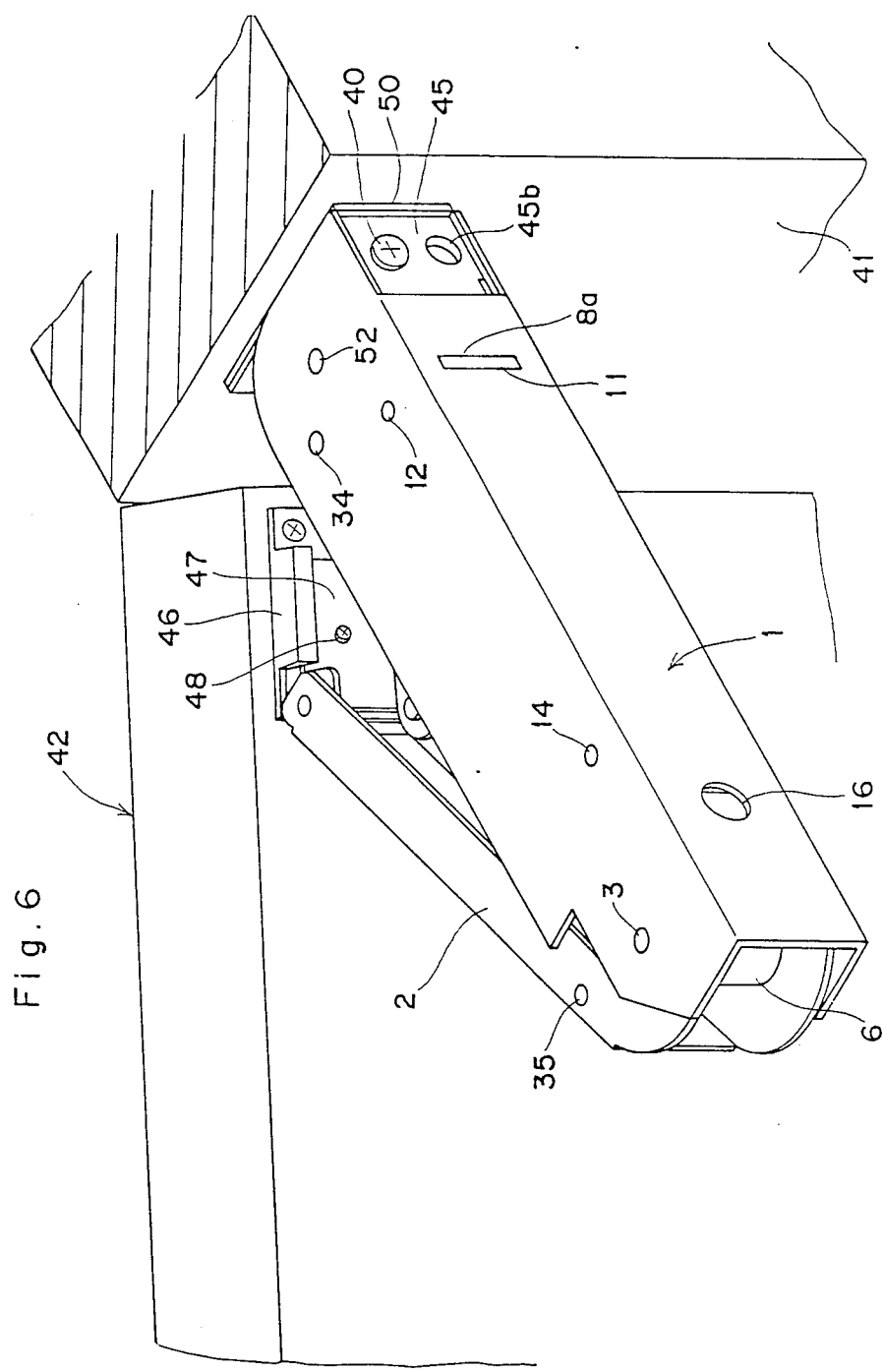
FIG. 6 is an enlarged perspective view of the door closer, with the door somewhat opened.
Figure 7:
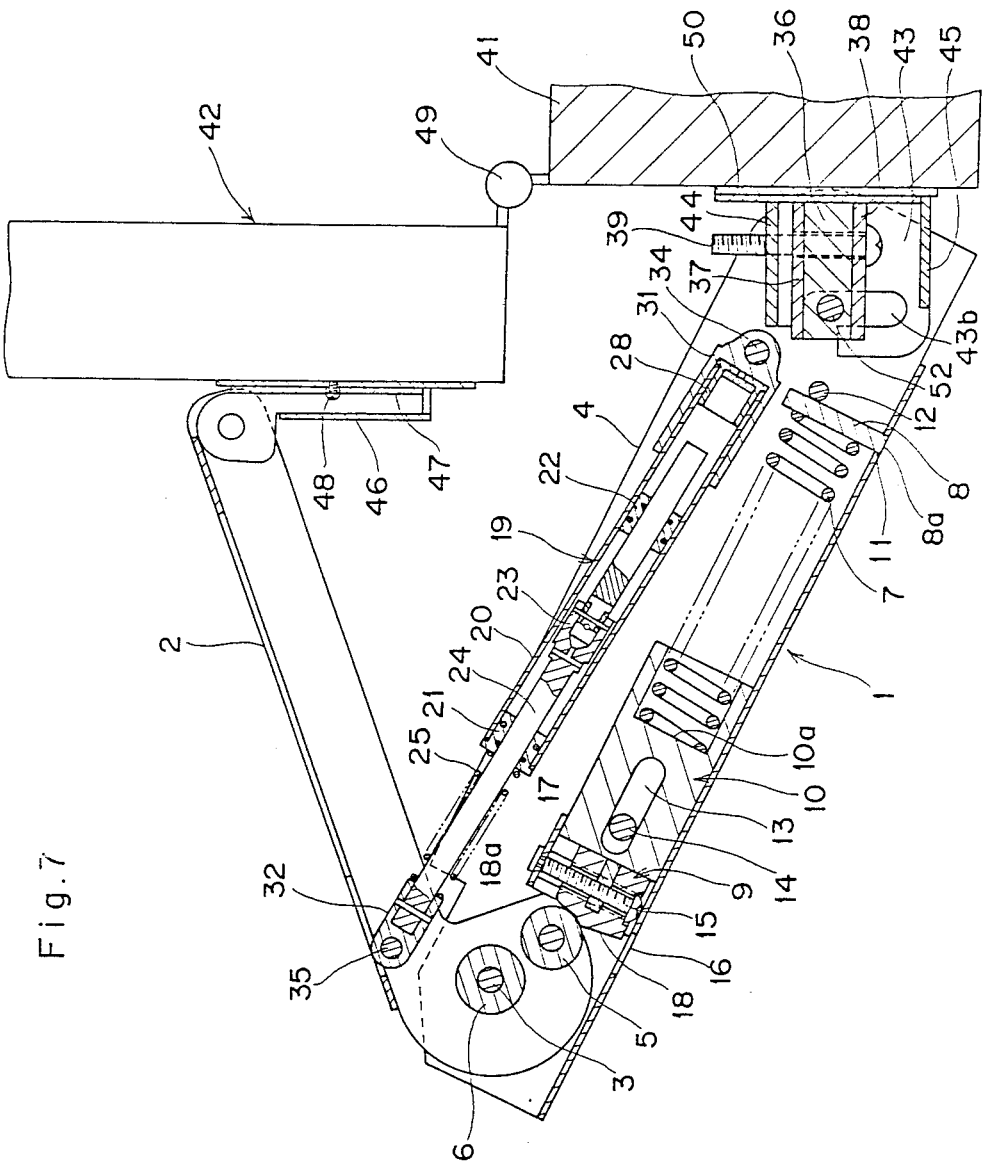
FIG. 7 is a plan view, in longitudinal section, of the door closer, with the door fully opened.

At the cam member 9 installed on the spring seat member 10, as shown in FIG. 5, ridges 9a formed on opposite sides of the cam member 9 engage grooves 10c formed on the inner surface of a recess 10b on one end of the spring seat member 10. A screw 15 is threadedly fitted in the cam member 9, and the latter can be moved toward and away from the web portion of the case 1 by rotating said screw 15 as by a screwdriver which is passed through a hole 16 formed in the web portion. The numeral 17 denotes a plate attached to the spring seat member 10 for rotatably supporting the free end of the screw 15. The surface of the cam member 9 opposed to the spring pressure transmission roller 5 is formed with a cam surface 18 (which will be later described), with said roller 5 pressed against said camming surface 18.

Figure 8:
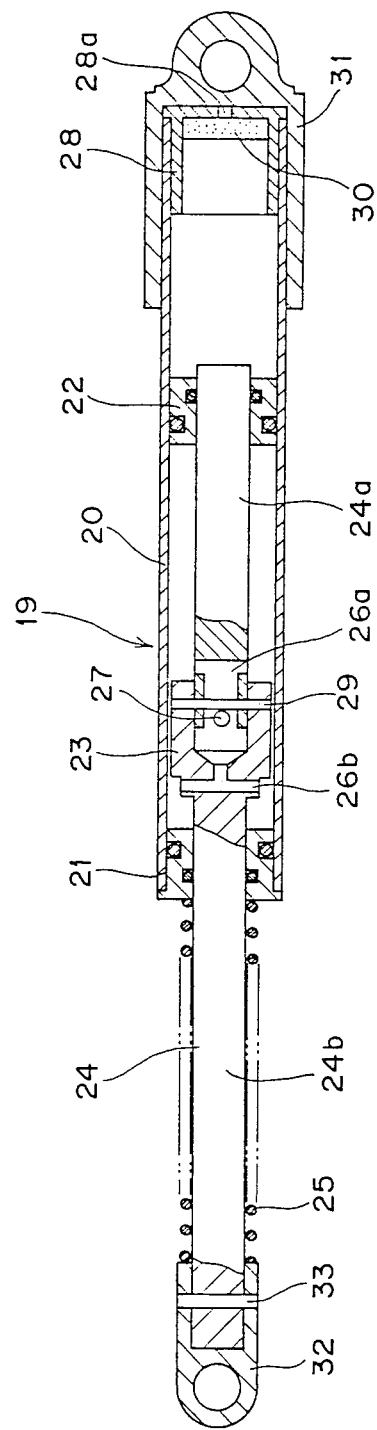
FIG. 8 is a sectional view of a cylinder device forming a brake device.

The numeral 19 denotes a brake device (cylinder device) interposed between one end of the link 2 and the other longitudinal end of the case 1. The brake device 19, as shown in FIG. 8, comprises a cylindrical body 20 forming a cylinder casing, a rod 24 inserted in said cylindrical body 20 from one end thereof and slidably supported by a bearing 21 installed in one end of the cylindrical body 20 and by a bearing 22 installed in the cylindrical body 20 at a position somewhat deviated from its middle region toward the other end of the cylindrical body 20, a piston 23 installed in the longitudinal intermediate region of the rod 24 between said two bearings 21 and 22, a coil spring 25 fitted on the portion of the rod 24 projecting out of the cylindrical body 20 for urging the rod 24 in the direction to project beyond one end of the cylindrical body 20, and oil (not shown) filled in the space between the two bearings 21 and 22.

More particularly, the rod 24 is constructed by interconnecting two rod members 24a and 24b end to end, said piston 23 being formed on one end of the other rod member 24b which is capable of receiving one end of one rod member 24a. In the region where said piston 23 is formed, the two rod members 24a and 24b are connected together by a pin 29. In the region where the two rod members 24a and 24b are fitted together, the rod members 24a and 24b are internally formed with channels 26a and 26b communicating with each other and opening to the space between the bearings 21 and 22 on opposite sides of the piston 23. A check valve 27 is installed in the channels 26a and 26b which operates to cut off the communication between the channels 26a and 26b when the rod 24 advances into the cylindrical body 20.

When the rod 24 advances into the cylindrical body 20, the rod 24 also advances into the space between the bearing 22 and the other end of the cylindrical body 20. To prevent the rod 24 from rusting, a small amount of oil (not shown) is contained in the inner space of the cylindrical body 20 between the bearing 22 and the other end of the cylindrical body 20. The numeral 28 denotes a cap which closes the other end of the cylindrical body 20, said cap 28 being centrally formed with a small vent hole 28a. A member 30, such as foamed plastic, having air permeability and capable of absorbing oil is placed on the inner surface of the cap 28. The numeral 31 denotes a connecting member fitted on the other end of the cylindrical body 20, and 32 denotes a connecting member fitted on the free end of the rod 24 projecting out of the cylindrical body 20, said connecting member 32 being connected to the rod 24 by a pin 33. The coil spring 25 fitted on the rod 24 abuts at one end thereof against the bearing 21 and at the other end against the connecting member 32, thereby urging the rod 24 in the direction to project out of one end of the cylindrical body 20. The connecting member 31 fitted on the other end of the cylindrical body 20 is supported on a shaft 34 installed in the case 1 in the vicinity of the other longitudinal end thereof. The connecting member 32 fitted on and connected to the front end of the rod 24 is supported on a shaft 35 installed in the link 2 in the vicinity of one end thereof.

The numeral 36 denotes a block of synthetic resin attached to a shaft 52 installed in the other longitudinal end of the case 1. Mounted on opposite lateral surfaces of the block 36 are metal plates 37 and 38 which are parallel to the shaft 52 and to the longitudinal direction of the case. 1. One plate 37 disposed on the side associated with the opening 4 in the case 1 is formed with a hole 37a for passing a screw 39 therethrough and a threaded hole 37b for threadedly receiving a screw 40 therein. The other plate 38 is formed with two holes 38a and 38b for passing the screws 39 and 40 therethrough.

The numeral 41 denotes an attachment frame of a building, and a door 42 is attached to said attachment frame 41 so that it is turnable around a vertical axis. A bearing member 43 for supporting the other longitudinal end of the case 1 in parallel relationship to the door 42 is attached to the attachment frame 41 adjacent the upper end thereof by set screws 51 with a metal plate 50 interposed therebetween. The bearing member 43 has plate portions 43a positioned between the inner surfaces of the two flanges of the casing 1 and the block 36, said plate portions 43a having grooves 43b for engagement with the shaft 52. More particularly, the grooves 43b are substantially L-shaped to allow the shaft 52 to engage the grooves 43b obliquely from the end of the case 1. The shaft 52, after engaging the grooves 43b, is movable therein in the direction of the grooves 43b. Metal plates 44 and 45 abut against the bearing member 43, and said block 36 and hence the shaft 52 are movable between these two plates 44 and 45 in a transverse direction of the case 1.

One screw 39 is inserted in the block 36 from the other plate 38 to project beyond the hole 37a in one plate 37 and is threadedly fitted in a threaded hole 44a formed in the plate 44. Thereby, the plate 44 is drawn toward the block 36 engaging the bearing member 43, until the plate 44 abuts against the bearing member 43. The other screw 40 is inserted in the block 36 from the hole 45a formed in the plate 45 and threadedly fitted in threaded hole 37b in one plate 37 to move the block 36 within the bearing member 43 in a transverse direction of the case 1. After the adjustment by the other screw 40, one screw 39 is tightened to fix the block 36 in position. The plate 44 is formed with a hole 44b for receiving the free end of the other screw 40, while the plate 45 is formed with a hole 45b for receiving a screwdriver to make it possible to adjust one screw 39 from outside the bearing member 43.

The case 1 of the door closer is supported on the attachment frame 41 by means of said block 36, shaft 52, bearing member 43, plates 44, 45 and screws 39, 40. The other end of the link 2 which is pivotally supported at one end thereof by one longitudnal end of the case 1 is connected to the door 42 in that the connecting member 47 pivotally supported by the other end of the link 2 is fitted in the support member 46 attached to the inner surface of the door 42 at its end close to the attachment frame 41 and is fixed in position by the set screw 48.

In the door closer constructed in the manner described above, when the door 42 connected to the link 2 is moved for opening around the vertical axis, the roller 5 abuts against the cam surface 18 of the cam member 9 to compress the coil spring 7. The force of the coil spring 7 is transmitted to the door 42 in the door closing direction successively through the cam surface 18 of the cam member 9, the roller 5 abutting against said camming surface 18, and the link 2. Thus, when the hand is removed from the door 42, the latter is automatically closed by the force of the coil spring 7.

During this closing movement of the door 42, the brake device 19 operates to prevent the door 42 from striking the attachment frame 41 with an impact. That is, when the door 42 closes, the link 2 pushes the rod 24 into the cylindrical body 20, so that the piston 23 tends to move toward the bearing 22. At this time, the check valve 27 is closed and the oil contained between the piston 23 and the bearing 22 flows to the space between the piston 23 and the bearing 21. The clearance between the periphery of the piston 23 and the inner surface of the cylindrical body 20 is so small that the rate of low of oil is very low, whereby braking is applied When the door 42 is opened, the link 2 opens at an angle with the casing 1, whereby the rod 24 is moved in the direction to project out of the cylindrical body 20. Simultaneously with this movement of the rod 24, the piston 23 tends to move toward the bearing 21, then the oil contained between the piston 23 and the bearing 21 pushes the check valve 27 open and flows through the channel 26a and 26b and along the periphery of the piston 23 into the space between the piston 23 and the bearing 22. The coil spring 25 prevents the brake device 19 from chattering between he casing 1 and the link 2.

The cam surface 18 of the cam member 9 has a step portion 18a in the intermediate region as viewed in the direction of movement of the cam member 9, so that when the door 42 is opened through about 90 degrees, for example, the roller 5 abuts against the step portion 18a to maintain the opened state of the door 42. When the door 42 is to be closed from the state in which the roller 5 is abutting against the step portion 18a, the door is pushed by hand in the closing direction, whereby the engagement between the step portion 18a and the roller 5 is canceled and the door 42 is automatically closed by the force of the coil spring 7.

The cam member 9 can be moved in a transverse direction of tne case 1 by means of the screw 15 to make it possible for the roller 5 not to abut against the step portion 18a when the door 42 is opened through 90 degrees, for example, so that the door 42 is automatically closed when the hand is removed from the door 42.

Figure 9:
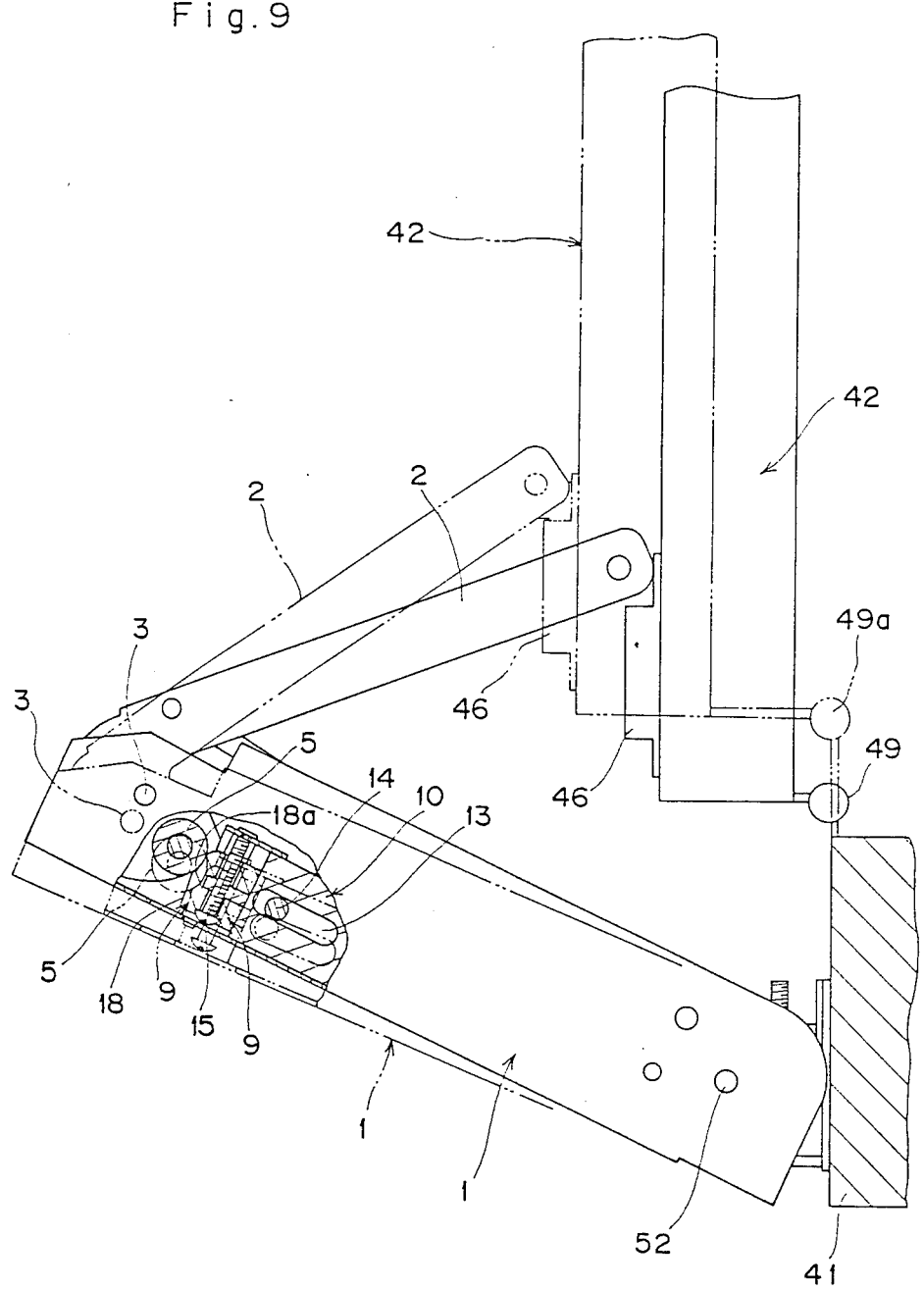
FIG. 9 is a plan view of the door closer, with the principal portion shown in section to explain the operation of the cam member.
Figure 10:
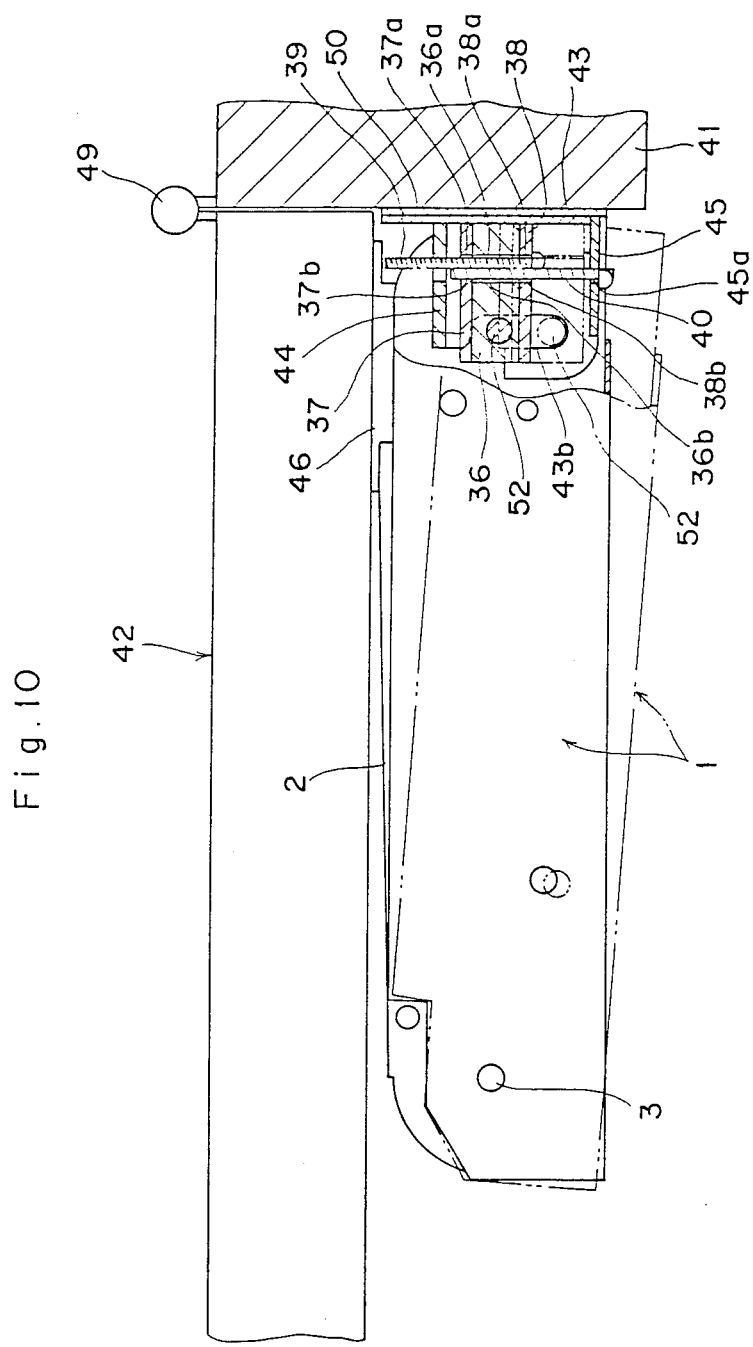
FIG. 10 is a plan view of the door closer, with the principal portion shown in section to explain the operation of a spring adjusting section.

Because of the difference between the state in which the door 42 is attached using a hinge 49 as shown in solid lines in FIG. 9 and the state in which the door 42 is attached using a hinge 49a as shown in imaginary lines projecting out of the solid line state, the position at which the door 42 opens differs. Therefore, the position at which the roller 5 abuts against the cam surface 18 differs. Thus, irrespective of the attached state of the door 42, it is possible to make an adjustment so that the relationship between the cam surface 18 and the roller 5 remains the same.

By adjusting the position of the block 36 in a transverse direction of the case 1 by means of the screws 39 and 40, the angle of the case 1 with respect to the bearing member 43 is changed. When the case 1 is tilted with respect to the bearing member 43 as shown in imaginary lines in FIG. 10, the pressing force of the coil spring 7 is increased through the roller 5 and cam member 9. Thus the spring force can be adjusted to increase.

What is claimed is:

1. A door closer adapted to be installed between a door element and an attachment frame element, said door closer comprising:
   a case having a first end connectable to one of said elements and a second end oposite said first end;
   a link having one end pivotally connected to the second end of said case and a free end connectable to the other of said elements, said link being pivotal in response to opening and closing of said door element between a forst position in which said link is disposed within said case and a second position in which the free end of said link is displaced from said case;
   a roller carried by said link in radially spaced relation to the pivotal connection between said link and said case;
   a cam member movably carried by said case and having a cam surface engageable with said roller; and
   means installed in said case for resiliently urging said cam surface into abutment with said roller and said link into said first position thereof.

2. A door closer as set forth in claim 1, wherein the cam surface of said cam member has a step portion which, when the door is opened to a given angle, is adapted to engage the roller to maintain the door in the opened state, the engagement between the step portion and the roller being canceled when the roller is forced to move in the closing direction.

3. A door closer as set forth in claim 2, including means for moving said cam relative to said roller, whereby the relative angle between the case and the link at which the step portion of said cam surface engages the roller is changed.

4. A door closer as set forth in claim 1, including a cylinder means which functions as a brake device, said cylinder means comprising a cylinder casing, a rod, two bearings for supporting the rod for longitudinal sliding movement within the cylinder casing, and a piston installed on the portion of the rod between the bearings and movable as a unit with the rod lengthwise of the cylinder casing, with oil filled between the bearings in the cylinder casing so that the movement of said piston causes the oil to flow between chambers defined on opposite sides of the piston.

5. A door closer as set forth in claim 1, wherein said urging means is composed of a compression coil spring adapted to increase its urging force as the angle between the casing and the link increases as the degree of opening of the door increases, said door closer having a pin which pivotally supports said case first end of the case and a bearing member which supports said pin, and means for moving said pin relative to said bearing for adjusting the angle between the case and the link, thereby adjusting urging force of said compression coil spring.

* * * * *

UNITED STATES PATENT AND TRADEMARK OFFICE
CERTIFICATE OF CORRECTION

PATENT NO. : 4,773,125
DATED : September 27, 1988
INVENTOR(S) : Takaharu Watabe

It is certified that error appears in the above-identified patent and that said Letters Patent are hereby corrected as shown below:

Column 4, line 32 - "Ihe" should read --The--

Column 5, line 18 - "he" should read --the--

Column 5, line 32 - "tne" should read --the--

Column 6, line 10 - "forst" should read --first--

Column 6, line 51 - "said case first end" should read --said case at said first end--

Signed and Sealed this

Twenty-first Day of February, 1989

Attest:

DONALD J. QUIGG

Attesting Officer

Commissioner of Patents and Trademarks